United States Patent
Jarl

(10) Patent No.: US 7,369,555 B2
(45) Date of Patent: May 6, 2008

(54) CHANNEL RESOURCE ALLOCATION ARRANGEMENT AND METHOD

(75) Inventor: Patrik Jarl, Farsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1019 days.

(21) Appl. No.: 10/206,861

(22) Filed: Jul. 29, 2002

(65) Prior Publication Data

US 2003/0026262 A1 Feb. 6, 2003

Related U.S. Application Data

(60) Provisional application No. 60/308,607, filed on Jul. 31, 2001.

(51) Int. Cl.
  *H04L 12/56* (2006.01)
(52) U.S. Cl. ...................... 370/392; 370/389
(58) Field of Classification Search ............... 370/401, 370/395.1, 395.5, 395.52, 402.409, 395.63, 370/395.61, 389, 399, 395.7, 395.31, 392, 370/393, 395.3, 394, 474, 476, 391
  See application file for complete search history.

(56) References Cited

U.S. PATENT DOCUMENTS 5,623,493 A * 4/1997 Kagemoto ................ 370/397
6,341,131 B1 * 1/2002 Eneroth et al. ......... 370/395.61
6,393,025 B1 * 5/2002 Merritt ..................... 370/395.6
6,535,526 B1 * 3/2003 Oyamada et al. ........... 370/477
6,829,254 B1 * 12/2004 Rajahalme et al. ......... 370/535

FOREIGN PATENT DOCUMENTS

WO 99/33314 A1 7/1999

OTHER PUBLICATIONS

European Search Report mailed Oct. 18, 2001.

* cited by examiner

*Primary Examiner*—Brenda Pham
(74) *Attorney, Agent, or Firm*—Nixon & Vanderhye, P.C.

(57) ABSTRACT

A method and apparatus are proposed for dynamically allocating units of user data to resource devices when the user data is transmitted in small packets multiplexed onto long packets and both the long and short packets contain routing information relating to each unit of user data. In the arrangement A mapping table is provided containing identifiers that identify a group of resource devices. A receiving unit extracts routing information from the long packets. For each unit of data, a first bit sequence of the routing information is used to address the table and obtain a group identifier. Subsequently, a second bit sequence taken from the routing information is concatenated onto the group identifier obtained to generate a resource identifier identifying a single resource device. The mapping table is preferably implemented as a writable RAM or portion of the same.

14 Claims, 5 Drawing Sheets

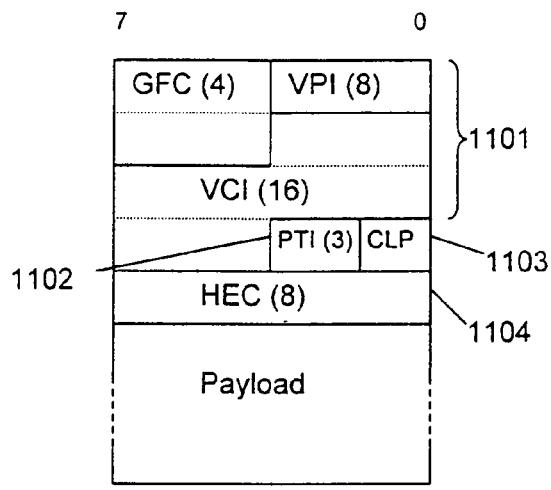
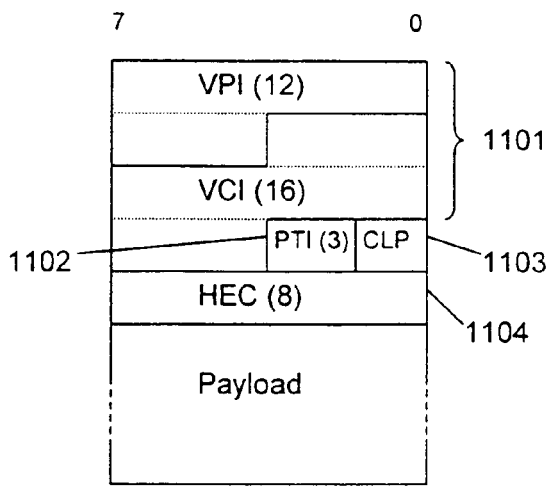
Fig. 2a  Fig. 2b
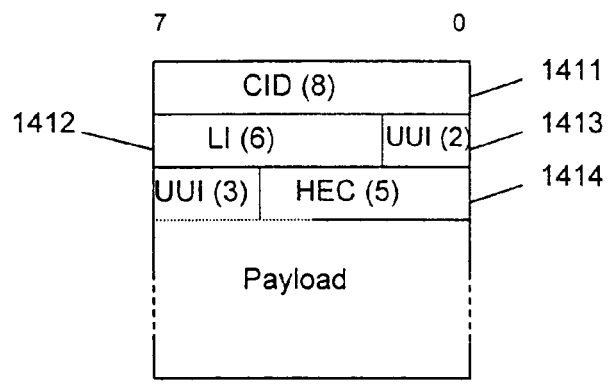
Fig. 3

CHANNEL RESOURCE ALLOCATION ARRANGEMENT AND METHOD

This application claims the benefit of Provisional Application No. 60/308,607, filed 31 Jul. 2001, the entire content of which is hereby incorporated by reference in this application.

FIELD OF INVENTION

The invention relates to the transport of data over a packet switching network in which data is carried in small packets multiplexed into larger data units, such as in ATM using the ATM Adaptation Layer 2. The invention has particular relevance to the mapping of voice data carried over an ATM trunk to a limited number of resource devices.

BACKGROUND ART

Asynchronous transfer mode (ATM) is a protocol-independent, cell-switching technology that offers quality of service guarantees for the support of voice, data and video traffic. ATM uses a layered protocol model. The ATM Adaptation Layer (AAL) provides the necessary services to support the higher-level protocols and can exist in end stations or in network switches of a link or network. This layer assures a number of tasks including segmenting the information into 53-byte cells and reassembling it back into its original format. Several different AAL protocols have been defined for different applications. The asynchronous transfer mode adaptation layer 2 (AAL2) protocol was first defined in the ITU-T Recommendation I.363.2 in 1997 and is the most favourable of the protocols for supporting low and variable bit rate (LBR/VBR) voice-over-ATM. Variable bit rate (VBR) services enable statistical multiplexing for the higher layer requirements demanded by voice applications, such as compression, silence detection and/or suppression, and idle channel removal. Moreover, AAL2 enables multiple user channels on a single ATM virtual circuit or virtual channel connection (VCC) and varying traffic conditions for each individual user or channel. The structure of AAL2 also provides for the packing of short length packets (or packet segments) into one ATM cell. This protocol thus offers a variable payload within cells and across cells which provides good bandwidth efficiency. For these reasons, AAL2 is the most suitable protocol for voice traffic, since it provides low packetisation delay which enables an operator to provide adequate quality of service to the user, and also allows the efficient use of bandwidth, which is of economic importance to many telephone operators who have leased lines in their networks.

All AAL protocols define a cell header that includes routing information in the form of a virtual path (VP) and virtual channel (VC) identifier. The AAL2 permits information from several channels to be carried in a single ATM cell. To this end the cell payload may contain multiple AAL2 packets, each of which has a packet header including a 'connection identifier' (CID) that identifies the individual AAL2 channels. The CID consists of 8 bits, so theoretically 256 different AAL2 user channels could be multiplexed in a single ATM virtual channel connection (VCC). In practice this number is reduced to 248 since eight identifiers are reserved. When a number n of ATM virtual channel connections are used identified by the VPI/VCI combination, the total number of user channels available is n×248. A problem exists when these channels must be processed before reaching the final end destination. For voice applications this processing may involve the compression and decompression of channels to optimise bandwidth utilisation. Providing a resource for compression and decompression for each channel is costly, inefficient and often physically impossible. However, when fewer resources than the total number of user channels are available, some form of mapping is required. Presently available applications use fixed mapping between the VP/VI and CID and resource identity. Fixed mapping may keep delays to a minimum and permit a relatively compact hardware implementation, however, changes in the network may mean that it is impossible to make the most efficient use of all resources.

It is thus an object of the present invention to present a method and arrangement for permitting the dynamic mapping of user channels or other packet-switched data to resources.

It is a further object to provide a method and arrangement of dynamic mapping of user channels or other packet-switched data to resources that imposes only a minimal delay on processing, and preferably that is both compact and easy to implement.

BRIEF SUMMARY

The present technology proposes a method and apparatus for allocating units of user data to resource devices when the user data is transmitted in small packets multiplexed onto long packets and both the long and short packets contain routing information relating to each unit of user data. A mapping table is provided that contains group identifiers that identify a group of resource devices, providing a receiving unit for receiving long packets, that contain one or more short packets and extracting the routing information. For each unit of data, a first bit sequence of the routing information is used to address the table and obtain a group identifier. Subsequently, a second bit sequence taken from the routing information is concatenated onto the group identifier obtained to generate a resource identifier identifying a single resource device. The mapping table is preferably implemented as a writable memory such as a random access memory (RAM) or portion of the same.

By providing a mapping table that contains identifiers for groups of resources as opposed to a single resource and using part of the routing information to address this table and joining a further portion of the routing information to the addressed group identifier the required size of the table can be considerably reduced. Moreover, whilst the mapping between user data and resource devices is fixed within the groups, the table as a whole can be reprogrammed and the allocation for these groups changed freely to best distribute the user data among the resource devices. It will be understood that a long packet may contain only one short packet so that the short packet is only marginally shorter than a long packet.

When the table is arranged in rows and columns, routing information that is contained in a header of the long packet is preferably used as one of the column or row addresses, while a portion of the routing information in a header of the short packet is used as the other of the column or row addresses. In other words, if information from the long packet header is used as a row address, the column address is obtained from information from the short packet header, and vice versa. In this way, the column or row of group identifiers that is valid for all small packets contained in a long packet can be identified with the minimum look-up delay on receipt of the long packet. Similarly, the portion of the routing information contained in the small packet header is preferably taken from the first received bit sequence, i.e. the least significant bits, while the second bit sequence that is concatenated onto the group identifier is taken from the last received bit sequence, i.e. the most significant bits. This second bit sequence is then preferably prefixed to the group identifier to form the most significant bits of the resource identifier.

In accordance with a further aspect of the technology, the above objects are obtained in an arrangement for mapping user channel identifiers to resources, wherein said user channels are carried as multiplexed packets on multiple trunks and each user channel is allocated a trunk number and a channel number. The arrangement includes a receiver for receiving multiplexed packets on a trunk and for extracting a trunk number and a first sequence of bits of a channel number for each packet and also a memory containing words identifying a group of resources that is addressable with the trunk number and the first sequence of bits from the channel number to deliver a word. The arrangement further includes an identifier compiler for concatenating a second sequence of bits from the channel number to a word addressed and delivered using said trunk number and the first sequence of bits of said channel number to generate an individual resource identifier.

BRIEF DESCRIPTION OF THE DRAWINGS

Further objects and advantages of the present invention will become apparent from the following description of the preferred embodiments that are given by way of example with reference to the accompanying drawings. In the figures:

FIGS. 2a & 2b show the structure of an ATM cell header,

FIG. 3 shows the structure of a CPS packet header,

DETAILED DESCRIPTION OF THE DRAWINGS

Telephone traffic transmitted using a circuit switched connection requires a fixed bandwidth limiting the total network capacity. ATM provides a means of reducing the bandwidth and other resources required for a single call, moreover ATM Adaptation Layer 2 (AAL2) permits the merging of channels onto a single trunk, so reducing the delay perceived for any single channel.

Figure 1:
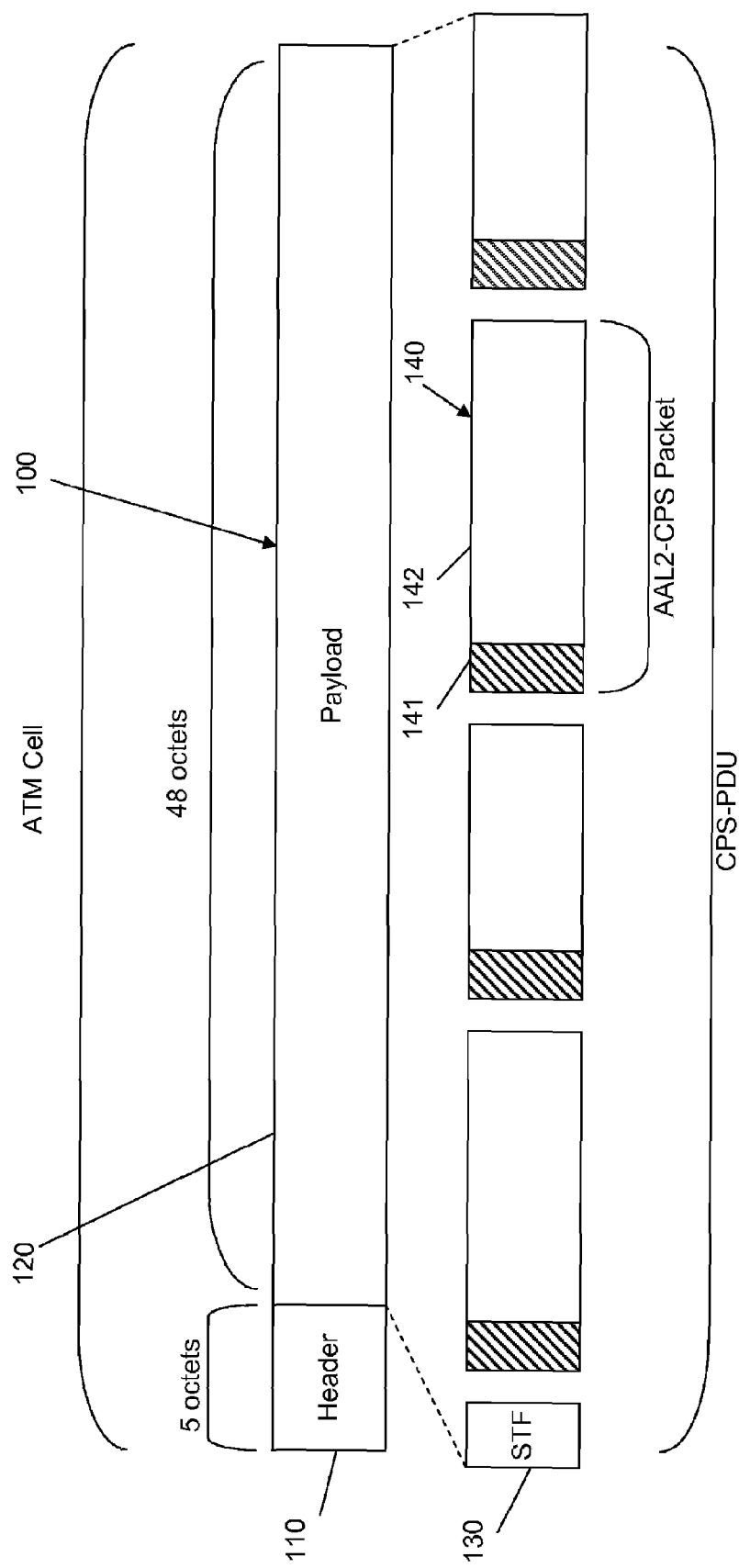
FIG. 1 schematically illustrates the structure of an AAL2 ATM cell.

AAL2 is divided into two sub-layers: the Common Part Sub-layer (CPS) and the Service Specific Convergence Sub-layer (SSCS). As these names suggest, the SSCS depends on the application to be supported, while the CPS is common to all applications. The present invention is concerned only with the CPS, and more specifically with the routing information contained therein, so the SSCS will not be described further here. The relationship between the structure of the CPS and the ATM layer is illustrated in FIG. 1. FIG. 1 shows an ATM cell 100 with a header 110 of 5 octets in length and a payload 120 of 48 octets. The contents of the header 110 will be discussed further with reference to FIG. 2. The AAL2 protocol layer defines a CPS protocol data unit (CPS-PDU) consisting of 48 octets, which is carried as the payload 120 of the ATM cell. A CPS-PDU 120 consists of a one-octet start field (STF) 130 and at least one CPS packet 140. A CPS packet is made up of a three-octet header 141, shown as the shaded region in FIG. 1, and up to 45 octets of payload data from a single user channel. In FIG. 1 four CPS packets 140 are contained in the ATM cell 100. This ATM cell 100 thus contains the multiplexed data from four different user channels. Transmission of data from a single user channel may be started in one ATM cell and continued in the next ATM cell. The start field (STF) 130 in the CPS-PDU 120 contains a 6-bit offset field, which identifies the location of the start of the first CPS packet 140 which starts transmission inside the CPS-PDU 120. The start field 130 further includes a parity bit for protecting the start field from errors and a sequence number for identifying cell loss.

The routing of a CPS packet 140 is defined by two levels of address information. A first level of addressing information is contained in the header 110 of the ATM cell; this defines the Virtual Channel Connection (VCC), which will be referred to as a trunk in this document. The second level is contained in the CPS packet header 141 and identifies the user channels carried on each ATM trunk. The structures of the ATM header 110 and the CPS packet headers 141 are illustrated in FIGS. 2 and 3, respectively. FIG. 2a shows an ATM header for the user-to-network interface (UNI), while FIG. 2b shows an ATM header for a network-to-network interface (NNI). With reference to FIGS. 2a and 2b, an ATM cell header 110 includes a routing field RF or Virtual Channel Connection (VCC) 1101. As shown in FIG. 2a, this routing field 1101 is 24 bits long for use in the UNI, while for NNI the routing field 1101 is 28 bits long as shown in FIG. 2b. In FIG. 2a, the routing field is preceded by a 4-bit generic flow control (GFC) field. This field is used only at the UNI to regulate the flow of traffic for different grades of service. In the headers illustrated in both FIGS. 2a and 2b, the routing field 1101 is followed by a 3-bit field for identifying the payload type PTI 1102, for example whether the cell contains user information or connection management information, a 1-bit Cell Loss Priority (CLP) field 1103 for indicating whether a cell may be discarded in the event of network congestion and a Header Error Check (HEC) field 1104 of eight bits for validating four previous octets of the header information. The Routing Field 1101 contains a Virtual Path Identifier/Virtual Channel Identifier (VPI/VCI) combination, which together define the ATM trunk or VCC. For UNI shown in FIG. 2a, the RF 1101 specifically consists of an 8-bit VPI and a 16-bit VCI. For NNI illustrated in FIG. 2b, the RF 1101 consists of a 12-bit VPI and 16-bit VCI.

Turning now to FIG. 3, the CPS packet header 141 contains an 8-bit Connection Identifier (CID) field 1411, a 6-bit Length Identifier (LI) field 1412 indicating the length of the CPS packet, a 5-bit User-to-User Indication (UUI) field 1413 and finally a 5-bit Header Error Check (HEC) field 1414. The CID 1411 identifies the user channel represented by the CPS packet. Eight connection identifiers are reserved, thus 248 user channels are permitted per ATM trunk and identified by a CID 1411.

Figure 4:
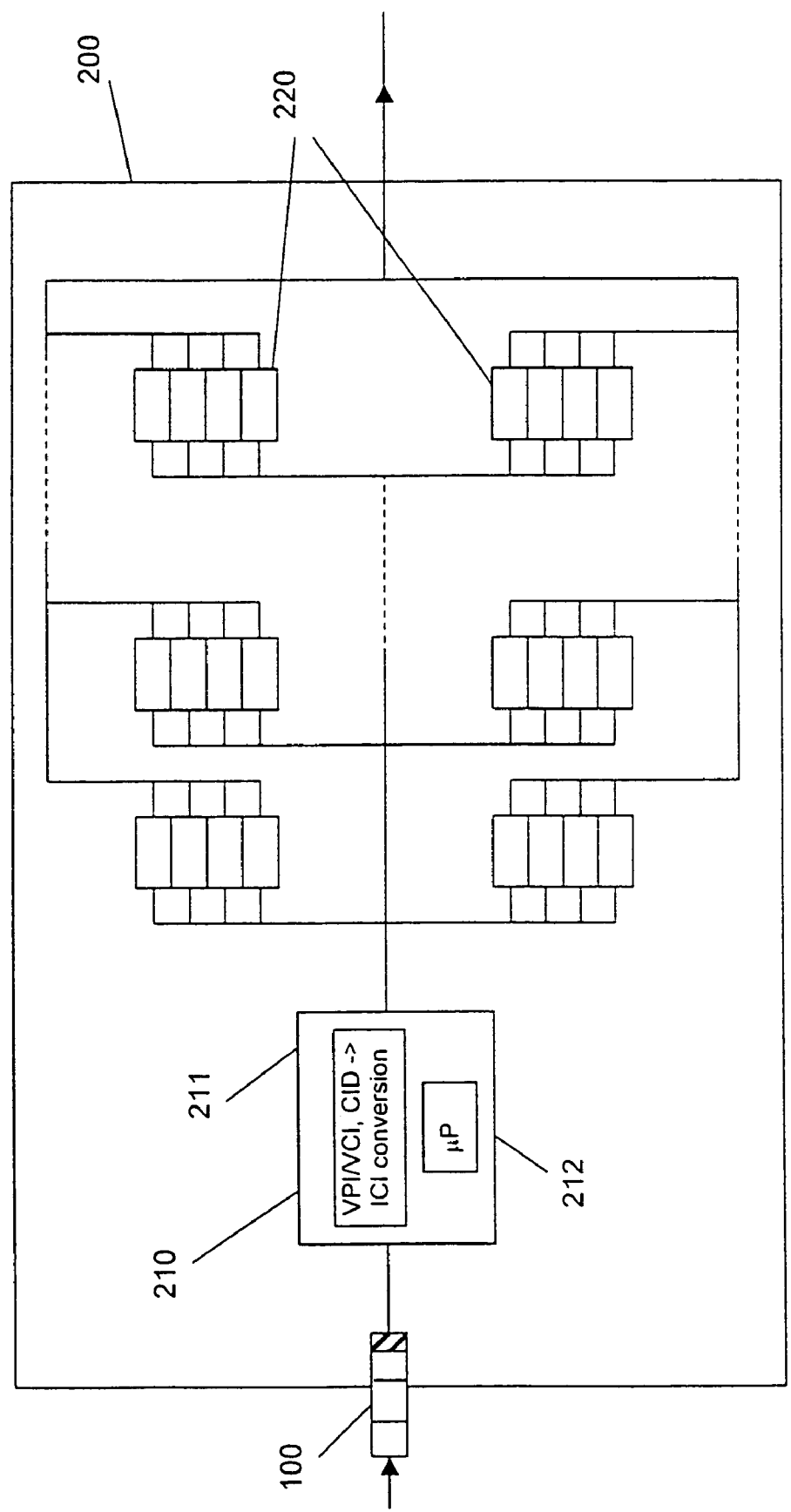
FIG. 4 schematically illustrates a network node with resources for handling ATM channels
Figure 5:
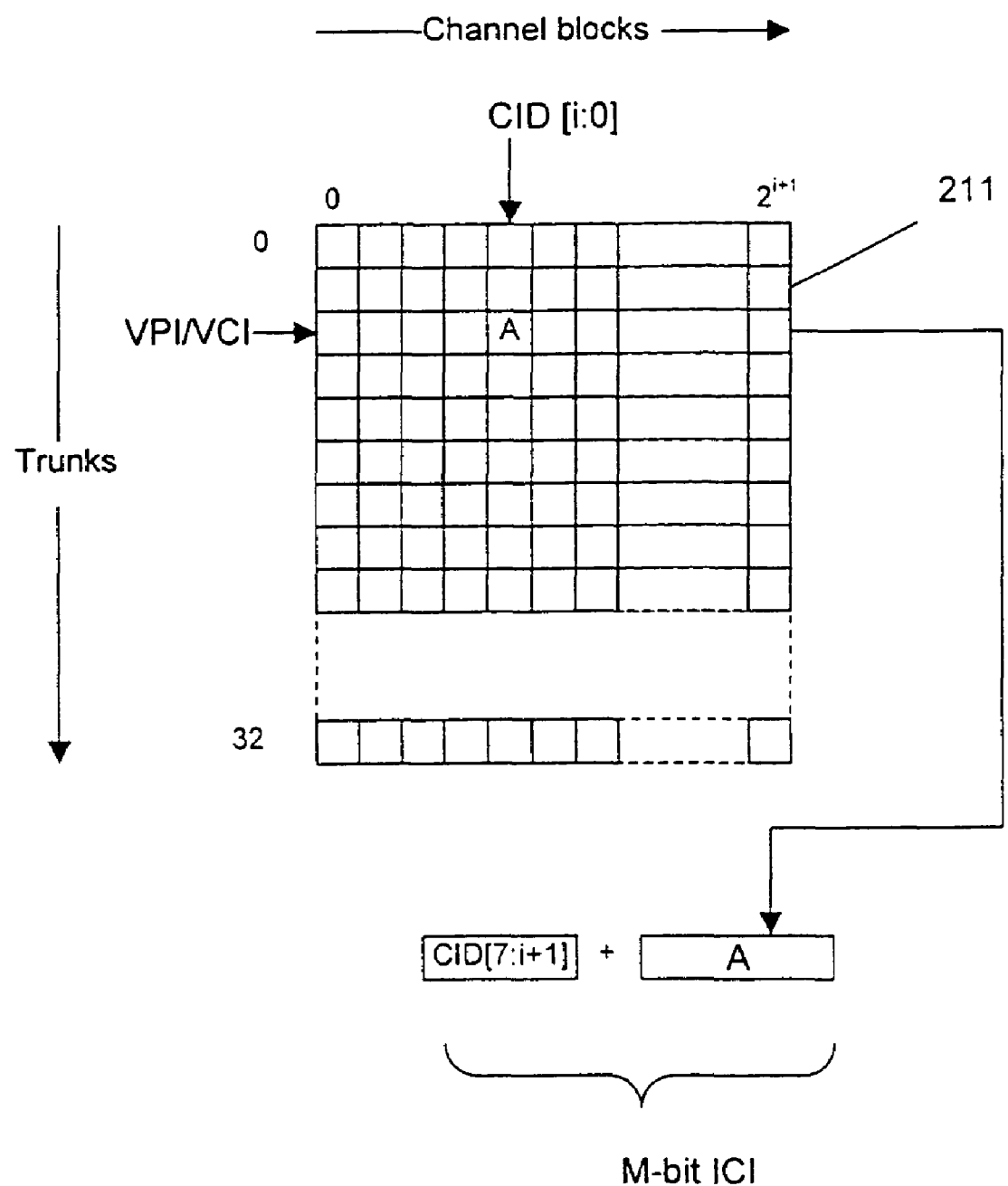
FIG. 5 illustrates schematically a remapping table for mapping data from AAL2 user channels to a resource.

FIG. 4 schematically illustrates a network node 200 for handling ATM cells in a known number of trunks. In the present embodiment, this node 200 includes a number of resources in the form of data compression/decompression units 220. The number of compression/decompression units 220 is less than the total number of user channels available, that is, the combination of the total number of user channels and the total number of ATM trunks. ATM cells 100 from any one of the trunks handled by this node 200 are initially intercepted by a conversion unit 210. In the present embodiment, this unit comprises a conversion table 211 and a microprocessor 212 with associated non-shown program memory and i/o devices. The microprocessor 212 controls receipt of the ATM cells, extraction of data from these cells, access of the conversion table 211 and also manipulation of data to generate an identifier for the resource devices. Alternatively, the microprocessor 212 may be replaced by a control interface that may be used by an external microprocessor or similar unit and hardware implementing the access to the conversion table 211 and subsequent generation of resource identifiers as discussed below. The unit 220 extracts information from the Routing Field 1101 of the ATM cell header 110, specifically from the VPI/VCI data, and also the Connection Identifier, CID 1411 from the CPS packet header 141 and with the conversion table 211 uses this information to generate a new identifier that uniquely identifies a resource in the form of a compression/decompression unit 220. This resource identifier is denoted an Internal Connection Identifier ICI. The conversion unit 210 performs a mapping function to map incoming CPS packets to one of the compression/decompression units 220. The mechanism used to perform this mapping is illustrated in FIG. 5. As schematically illustrated in FIG. 5, the mapping makes use of a mapping table 211, which in the present embodiment is a RAM or other similar writable memory space of defined dimensions. Each address location of the RAM 211 contains a word A of length n, which addresses a group of compression/decompression units 220. In other words, a predetermined group of user channels is allocated to a group of compression/decompression units. The rows of this RAM are addressed using specific bits extracted from the Routing Field in the ATM cell header 110. This extracted VPI/VCI information 1101 specifies the particular trunk used by the ATM cell. In the present example, it is assumed that the network is operating with 32 trunks. Accordingly, 5 bits of the VPI/VCI are used to identify the trunk. In the present example these 5 bits are the least significant bits of the Routing Field of the ATM cell header and thus comprise bits 0 to 4, which will be referred to as VPI/VCI [4:0]. It will be understood, however, that the required number of bits may be taken from anywhere in the VPI/VCI. The columns of the RAM 211 forming the mapping table are addressed using information extracted from the Connection Identifier CID 1411 of the CPS packet header 141. This information is a sequence of least significant bits consisting of i+1 bits taken from the CID 1411, which will be referred to as CID[i:0]. The length of this bit sequence i+1, and thus the total number of columns $2^{i+1}$ in the RAM 211 depends on the number of channels or compression/decompression units 220 in a single group. In order to obtain the complete Internal Connection Identifier ICI for each user channel, the remaining bits of the CID 1411, i.e. bits CID[7:i+1] are prefixed to the word contained in memory to generate a word that uniquely identifies one of the units 220. Assuming that the number of resources available is $2^m$, or at least between $2^{m-1}$ and $2^m$, it will be evident that the sum of the word length n stored in each memory location and the number of remaining bits CID[7:i+1] must be equal to m.

While in the present example the trunk number VPI/VCI 1100 is used to address the table rows while a bit sequence from the CID 1411 is used to address the table columns, it will be appreciated that these may be reversed.

The remapping table 211 in the RAM is programmable. When used as in the present embodiment for routing call information to data compression and decompression circuitry 220, the table 211 is preferably fixed during a session. Naturally it may be programmed when no session is ongoing, for example when a new trunk or cross-connection is added to the network. By grouping the channel allocation, the remapping table 211 can be kept small, yet still allow flexibility in the mapping of user channels to resources. The effect of grouping the channels is to fix the mapping between a group of channels and a sequence of resource identification numbers or ICIs for a current programmed RAM table 211 configuration. However, since this grouping is known, it is possible to configure the system such that groups of channels contain specific application types. Naturally, if no channel grouping is performed, the table 211 in the RAM must be $m^3$ bits in size when the number of resources is between $2^{m-1}$ and $2^m$. Grouping the channel allocation such that these are assigned in twos reduces the table 211 to a half of this size, allocating channels in groups of four quarters the table size.

Figure 6:
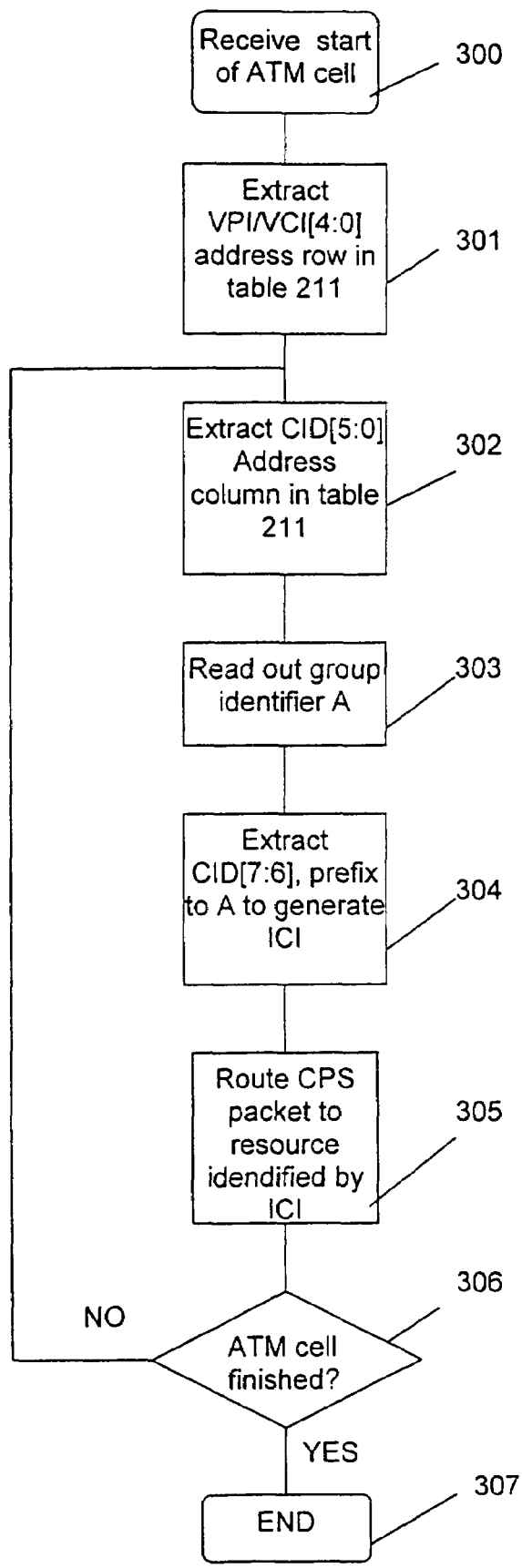
FIG. 6 is a flow chart illustrating the remapping procedure using the remapping table of FIG. 5.

This remapping procedure will be explained in more detail with reference to the flow chart shown in FIG. 6. For the example of FIG. 6, it is assumed that a total of 32 trunks have access to the resources represented by the compression/decompression units 220, that 512 compression/decompression units 220 are present in the node 200, and that channels are allocated to the resources 220 in groups of four. In this example, therefore, only six bits of the CID are used to address the columns of table 211, that is, i=5 and bits CID [5:0] are used as column address, while the final two bits CID[7:6] are used to generate the resource identity ICI using the value looked up in table 211.

The procedure starts in step 300 with the receipt by the conversion unit 210 in node 200 of the start of an ATM cell 100. In step 301 the trunk number is obtained by extracting VPI/VCI[4:0], i.e. the five LSBs from the VPI/VCI field in the ATM cell header 110. The trunk number is then used to address one row in the table 211. In step 302, the CID 1411 of the first CPS packet header 141 is read and bits CID[5:0], that is the first six LSBs, used to address a column of memory 211. A 7-bit word representing the group identifier A is then read out in step 303. In step 304 the remaining two MSBs from the CID, that is CID[7:6], are extracted from the CID 1411 and prefixed to the 7-bit word A to generate a 9-bit ICI, which uniquely addresses one of the 512 resources 220. In step 305, the CPS packet associated with the CID is routed to the resource identified by the Internal Connection Identifier ICI. This terminates the mapping for a CPS packet. In step 306 the procedure checks whether the ATM cell has been completely received. If not, the procedure returns to step 302 to receive the CID 1411 from a following CPS packet 140. Otherwise the procedure terminates.

If the remapping table 211 is programmed with sequential words A, the user channels on the same trunk and with sequential CID 1411 will be allocated to sequentially addressed resources. It will be understood that the remapping of channels by groups of four as described with reference to FIG. 6 is just one possible configuration of the remapping table. With the described application for 32 trunks and 512 available resources 220, this configuration requires a RAM capacity of 14336 bits for the remapping table 211, and is thus relatively easy to accommodate, while retaining a fair amount of flexibility in the allocation of user channels to resources. However, it is entirely conceivable to perform the channel allocation by pairs of channels to obtain a greater flexibility or to group more than four channels together to reduce the required capacity of the RAM when the number of trunks is very high.

In the embodiment described above, the sequence of least significant bits (LSB) of the user channel CID 1411 are used to address the columns of the mapping table, while the remaining most significant bits (MSB) of the CID 1411 are then prefixed to the table contents to generate an identifier of the required length. Similarly, the trunk identifier VPI/VCI 1101 is first used to address a whole row of the remapping table 211, while the columns are addressed by a sequence of least significant bits from the CID 1411. This division of the routing information is the most efficient, since it reduces the processing delay. Specifically, when an ATM cell arrives at the conversion unit 210 the trunk number VPI/VCI 1101 will be received first and thus can be best used to address the required row that will be used for all CPS packets 140 contained in the cell 100. In other words, the VPI/VCI 1101 is used to identify a sequence of words A in the table 211. Likewise, the least significant bits of the CID 1411 of each CPS packet will be received by the conversion unit first and can be used to address the required column of table 211, i.e. the required word A from the sequence of words addressed by the trunk number VPI/VC/ 1101, and read out the addressed word A whilst the most significant bits of the CID 1411 are being received. However, it will be understood that the combined routing information for each CPS packet made up of the Routing Field 1101 of the ATM header and the CID 1411 from the CPS packet may be used differently to generate the ICI. For example, the first received bits (LSBs) of the Routing Field 1100 of the ATM cell may be used to address a row of the table 211, while subsequent bits from this Routing field may be used as the least significant bits of the column address together with the first received bits of each CID contained in the ATM cell 100.

In applications where processing delay is not critical the grouped allocation of channels may alternatively be achieved by using a bit sequence taken from the MSBs of the CID 1411 to address the table columns and subsequently suffixing the remaining LSBs of the CID 1411 to the end of the addressed word A. In this way, channels with sequential CIDs 1411 will be allocated to sequentially identified resource devices 220 or ICIs.

While the invention has been described with reference to an ATM application, it will be understood that the allocation of identifiers, be they resource identifiers or routing information, may be applied to any packet-oriented or frame-based data flow.

The invention claimed is:

1. A method of allocating units of user data to resource devices, wherein said user data is transmitted in short packets that are multiplexed onto long packets, and wherein said short and long packets contain routing information relating to each unit of user data,
the method comprising:
providing a mapping table containing group identifiers identifying a group of resource devices,
receiving a long packet and extracting routing information from said long packet,
for each unit of user data, using a first bit sequence of said extracted routing information to address said mapping table and obtain a group identifier, and
concatenating a second bit sequence of said routing information onto said obtained group identifier to generate a resource identifier identifying a single resource device.

2. A method as claimed in claim 1, wherein said routing information includes long packet routing data associated with each long packet and short packet data associated with each short packet, said method further including:
addressing said mapping table using at least a portion of said long packet routing data and a portion of said short packet routing data as said first bit sequence of said routing information.

3. A method as claimed in claim 2, wherein each group identifier stored in said mapping table is addressable with a row address and a column address, the act of addressing the mapping table further includes:
using at least a portion of said long packet routing data as one of said row or column addresses and using a portion of said short packet routing data as the other of said row or column addresses.

4. A method as claimed in claim 2, further comprising taking said portion of said short packet routing data for addressing said mapping table from a header of each short packet.

5. A method as claimed in claim 2, further comprising extracting a sequence of least significant bits from a header of each short packet as said portion of said short packet routing data for addressing said mapping table.

6. A method as claimed in claim 1, wherein said concatenating step includes prefixing said second bit sequence of said routing information onto said obtained group identifier.

7. An arrangement for allocating units of user data to resource devices, wherein said user data is transmitted in short packets that are multiplexed onto long packets, and wherein said short and long packets comprise routing information relating to each unit of user data, the arrangement comprising:
a set of resource devices, each resource device being allocated a resource identifier,
a mapping table containing group identifiers identifying a group of resource devices,
a receiving unit for receiving a long packet and extracting routing information,
processing means for addressing a location in said mapping table using a first bit sequence of said routing information to obtain a group identifier stored at said addressed location, and for concatenating a second bit sequence of said routing information onto said obtained group identifier to generate a resource identifier identifying a single resource device.

8. An arrangement as claimed in claim 7, wherein said mapping table is contained in a writable memory, such as a random access memory.

9. An arrangement as claimed in claim 7, wherein said routing information is composed of information contained in a header of each long packet and information contained in a header of each short packet, wherein
said receiving unit is arranged to extract said routing information from a header of each long packet and from a header of each short packet and
said processing means is arranged to use at least a portion of the information contained in said long packet header and a first portion of the information contained in said short packet header as said first bit sequence of said routing information to address said mapping table and a second portion of the information contained in said short packet header as said second bit sequence.

10. An arrangement as claimed in claim 9, wherein said mapping table is arranged in rows and columns, and wherein said processing means are arranged to address a row or column of said mapping table using the routing information contained in said long packet header, and to address a location containing a group identifier using the first portion of the information contained in said short packet header.

11. An arrangement as claimed in claim 10, wherein said first portion of the information contained in said short packet header is a sequence of least significant bits from a routing field in said header and said second portion of information contained in said short packet header is a sequence of most significant bits from said routing field in said header.

12. An arrangement as claimed in claim 7, wherein said resource devices include at least one data compression and/or decompression device.

13. An arrangement for mapping user channel identifiers to resources, wherein user channels are carried as multiplexed packets on multiple trunks and each user channel is allocated a trunk number and a channel number, the arrangement comprising:

means for receiving multiplexed packets on a trunk and for extracting a trunk number and a first sequence of bits of a channel number for each packet, a memory containing words identifying a group of resources, and being addressable with said trunk number and said first sequence of bits from said channel number to deliver a word, an identifier compiler for concatenating a second sequence of bits from said channel number to a word addressed and delivered using said trunk number and said first sequence of bits of said channel number to generate an individual resource identifier.

14. An arrangement as claimed in claim 8, wherein said mapping table is contained in a random access memory.

* * * * *